(12) United States Patent
Chang et al.

(10) Patent No.: US 7,627,630 B2
(45) Date of Patent: Dec. 1, 2009

(54) SYSTEM FOR CONTROLLING MULTIPOINT CONFERENCE AND METHOD THEREOF

(75) Inventors: Kuo-Lung Chang, Junghe (TW);
Po-Wen Cheng, Junghe (TW);
Hsiang-Li Chen, Junghe (TW)

(73) Assignee: Awind Inc., Taipei County (TW)

( * ) Notice: Subject to any disclaimer, the term of this patent is extended or adjusted under 35 U.S.C. 154(b) by 407 days.

(21) Appl. No.: 11/470,415

(22) Filed: Sep. 6, 2006

(65) Prior Publication Data

US 2007/0266094 A1 Nov. 15, 2007

(30) Foreign Application Priority Data

May 15, 2006 (TW) .............. 95117050 A

(51) Int. Cl.
*G06F 15/16* (2006.01)
*H04B 7/00* (2006.01)
*G03B 21/00* (2006.01)

(52) U.S. Cl. .............. 709/204; 353/121; 370/310

(58) Field of Classification Search .......... 709/204; 370/310; 353/121

See application file for complete search history.

(56) References Cited

U.S. PATENT DOCUMENTS

| | | | | |
|---|---|---|---|---|
| 6,108,687 A * | 8/2000 | Craig | .............. | 709/203 |
| 6,560,637 B1 * | 5/2003 | Dunlap et al. | .............. | 709/204 |
| 6,735,616 B1 * | 5/2004 | Thompson et al. | .............. | 709/204 |
| 6,760,045 B1 * | 7/2004 | Quinn et al. | .............. | 715/744 |
| 6,793,352 B2 * | 9/2004 | Karasawa et al. | .............. | 353/122 |
| 7,006,055 B2 * | 2/2006 | Sukthankar et al. | .............. | 345/1.2 |
| 7,016,935 B2 * | 3/2006 | Lee et al. | .............. | 709/204 |
| 7,018,043 B2 * | 3/2006 | Castaldi et al. | .............. | 353/30 |
| 7,133,896 B2 * | 11/2006 | Ogdon et al. | .............. | 709/205 |
| 7,254,780 B2 * | 8/2007 | Taniguchi et al. | .............. | 715/751 |
| 7,313,589 B2 * | 12/2007 | Tran et al. | .............. | 709/203 |
| 7,403,969 B2 * | 7/2008 | White | .............. | 709/204 |
| 2002/0087435 A1 * | 7/2002 | Neishi et al. | .............. | 705/27 |
| 2002/0175915 A1 * | 11/2002 | Lichtfuss | .............. | 345/440 |
| 2003/0098819 A1 * | 5/2003 | Sukthankar et al. | .............. | 345/1.1 |
| 2005/0091302 A1 * | 4/2005 | Soin et al. | .............. | 709/200 |

OTHER PUBLICATIONS

Linksys, Inc. "Linksys WPG11 Wireless Presentation Gateway User Guide", 2002, 17 pages.*

* cited by examiner

*Primary Examiner*—George C Neurauter, Jr.
(74) *Attorney, Agent, or Firm*—Ming Chow; Sinorica, LLC

(57) ABSTRACT

A system and a method for controlling a multipoint conference are provided by the present invention. The system comprises a plurality of computers, a presentation gateway, and a projector, wherein the computers are stored presentation frames. The method comprises the steps of connecting a first computer to the presentation gateway via a network; downloading a user list on the network from the presentation gateway; submitting a presentation-request signal to a second computer of the user list; and the first computer having a granted authority to access the presentation frames of the second computer while under the condition of the second computer granting the presentation-request signal, and the first computer transmitting the presentation frames of the second computer to the projector through the presentation gateway.

8 Claims, 4 Drawing Sheets

SYSTEM FOR CONTROLLING MULTIPOINT CONFERENCE AND METHOD THEREOF

FIELD OF THE INVENTION

The present invention relates to a system and a method for a conference presentation, more particular to a system and a method for controlling a multipoint conference.

BACKGROUND OF THE INVENTION

The objective of a conference is for the attendants communicating opinions and messages to each other. In order for the conference to be proceeded smoothly, computers and projectors are the essential equipment to make the presentation data to be shown conveniently.

Generally, any conference can be held in two ways: a single presentation or a multipoint presentation. For the single presentation, there is only one speaker to make the presentation, therefore only one computer and one projector may be required as a basic requirement. On the other hand, the presentation data should be stored in the computer in advance so that it can be projected by the projector. Thereby, additional opinions or comments from the attendants shall be expressed by dictations that lose the opportunities of two-way communications.

A multipoint conference focuses on the communications of two sides or multiple sides. Usually, the multipoint conference has a subject which is discussed by a plurality of attendants in order to find a solution. Such multipoint conference is normally an academic seminar, a multi-department discussion, etc. Each attendant has the presentation frames in the computer thereof so as to present while at the time of his presentation. Obviously, it is inconvenient to everyone who makes a presentation, since each speaker has to firstly connect his computer to the projector, and another speaker may be doing the same way to have another presentation.

With reference to FIG. 1, there is a presentation gateway 2 with a wireless connection function. While connecting the presentation gateway 2 to a projector 4, any attendant of the multipoint conference can be through a computer 1 to log-in the network provided by the presentation gateway 2 in order to project the presentation frames to a screen 8.

However, no matter that the attendants connect to the projector via a direct way or a presentation gateway with wireless connection, all attendants shall constantly plug in and out or log-in and log-out for such connections so as to make the conference be not efficient.

SUMMARY OF THE INVENTION

The primary objective of the present invention is to provide a system for controlling a multipoint conference so as to let the conference be more smooth and efficient.

The second objective of the present invention is to provide a method for controlling a multipoint conference in order to let the conference be more smooth and efficient.

To reach above objectives, the present invention provides the system for controlling the multipoint conference, which comprises a plurality of computers, a presentation gateway, a conference control module, and a projector. The plurality of computers have presentation frames therein and are connected to the plurality of computers by means of networks for data transmission. The conference control module is capable of controlling the limits of granted authority for one of the plurality of computers, and therefore the computer is accessed for the presentation frames by other computers. The conference control module transmits the presentation frames to the projector or the plurality of computers via the presentation gateway.

The present invention provides the method for controlling the multipoint conference, which comprises the steps of connecting a first computer to the presentation gateway via the network; downloading a user list on the network from the presentation gateway; submitting a presentation-request signal to a second computer of the user list; the first computer having a granted authority to access the presentation frames of the second computer while under the condition of the second computer granting the presentation-request signal; and the first computer transmitting the presentation frames of the second computer to the projector or the plurality of computers through the presentation gateway.

Wherein the first computer firstly lists the second computer into a granted list and continuously determines whether the presentation frames of the second computer are transmitted or not under the condition of the first computer having a granted authority to access, the user list and the granted list are integrated by means of a conference control module, the conference control module is stored in the presentation gateway, and the conference control module is downloaded to the plurality of computers while the computers are connected to the presentation gateway, besides, the second computer submits an authority-prohibit signal to actively cancel the granted authority of the first computer accessing to the presentation frames of the second computer.

As mention above, through the system and the method for controlling the multipoint conference of the present invention, as soon as any user of the computers is granted to access other computers, the presentation frames in the computer of the user are transmitted to the projector or other computers in order to make the multiple conference be processed smoothly and efficiently.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENTS

The detailed description and technical characteristics of the present invention are described together with the drawings as follows.

Figure 1:
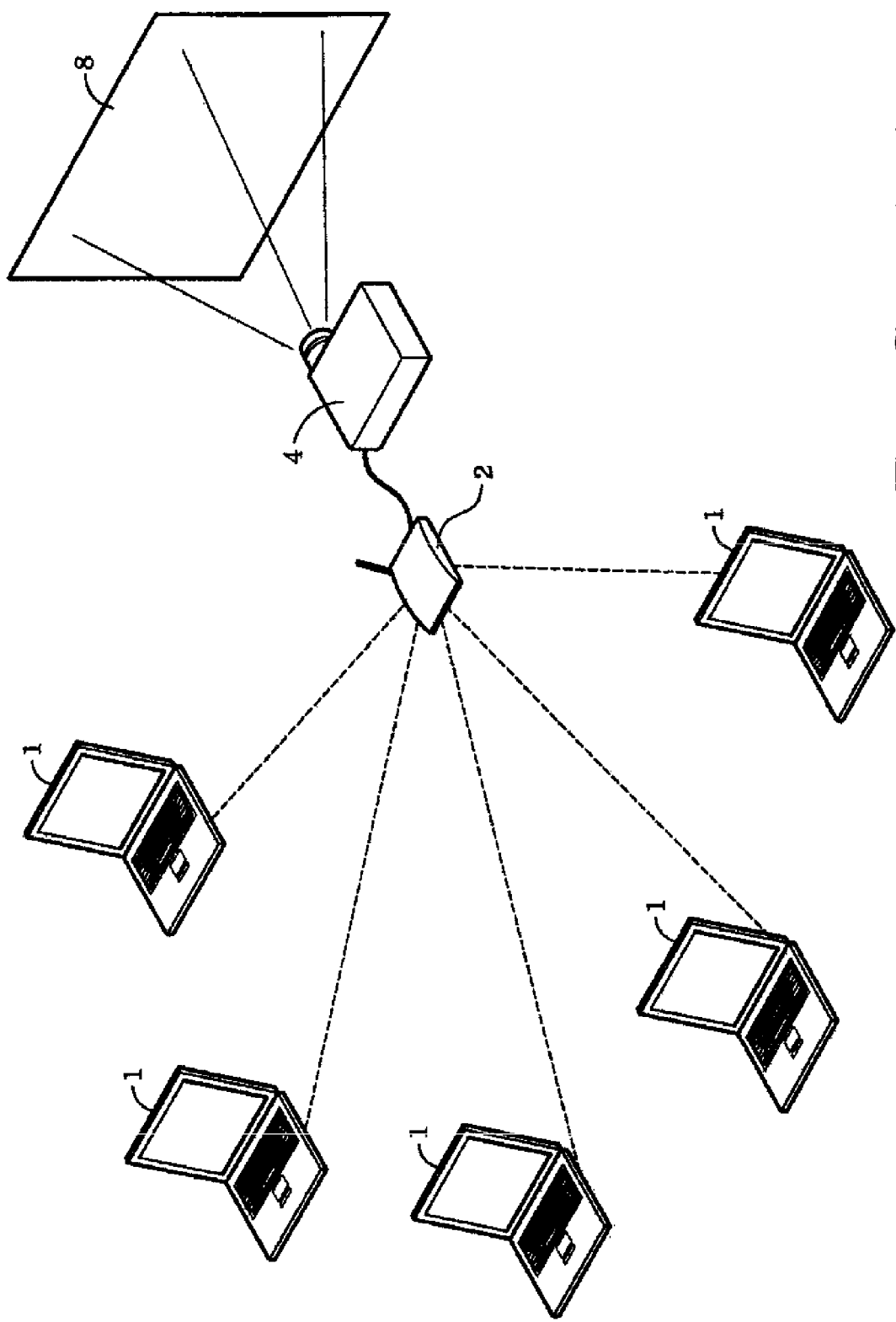
FIG. 1 illustrating a schematic view of a multipoint conference in prior arts.
Figure 2:
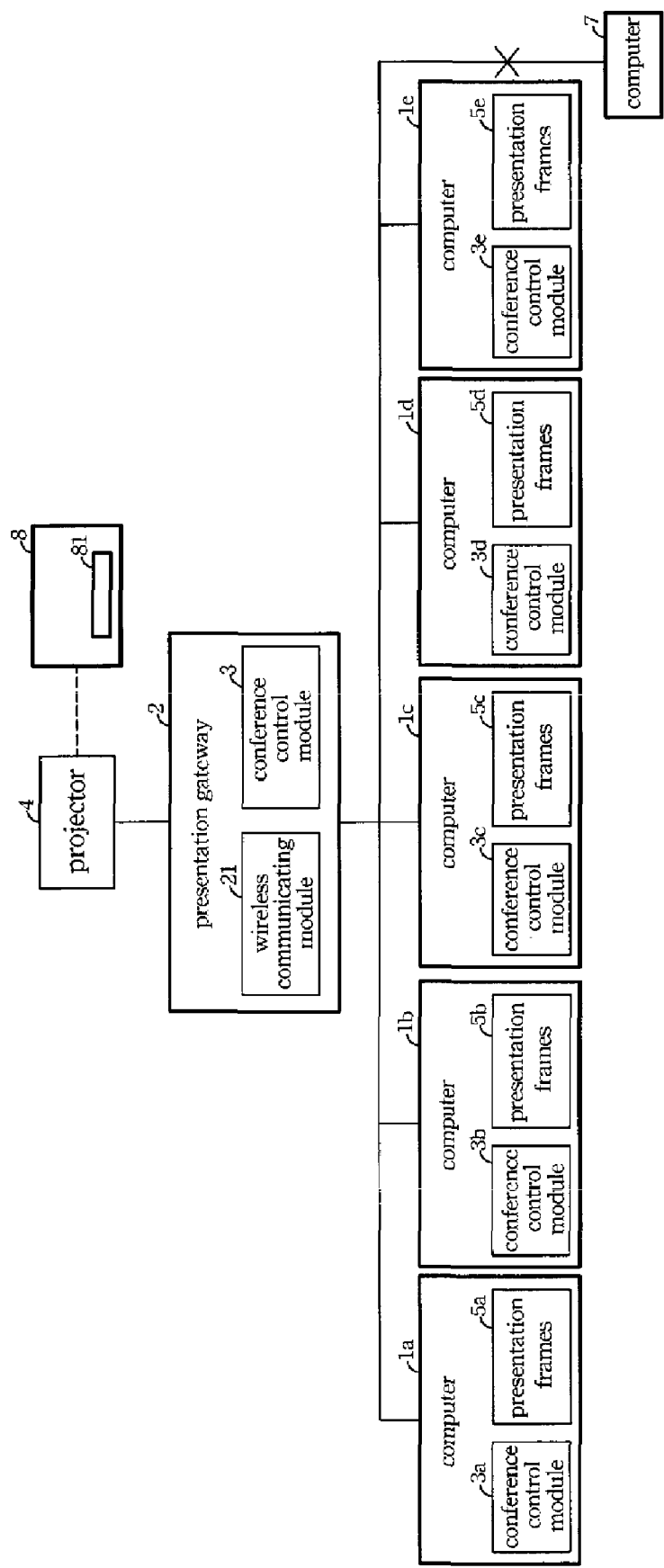
FIG. 2 illustrating a schematic structural view of a system for controlling a multipoint conference of the present invention.

With reference to FIG. 2, which illustrates a schematic structural view of a system for controlling a multipoint conference of the present invention. As shown in the FIG. 2, the system includes a plurality of computers, a presentation gateway 2, a conference control module 3, and a projector 4; wherein the presentation gateway 2 has a wireless communicating module 21 to connect to the computers for accessing via a network, the conference control module 3 is embedded into the presentation gateway 2, the projector 4 is connected to the presentation gateway 2 for data transmission.

Any one of the computers 1 for the multipoint conference at least comprises a first computer 1a, a second computer 1b, and a third computer 1c, each computer is stored with presentation frames 5 for the preferred embodiment, the presentation frames 5 can be shown on any of the computers 1. While any or more than one of the computers 1 are in the wireless scope of the presentation gateway 2, the networks of the computers 1 and the presentation gateway 2 are then built up so as to transmit more data for the multipoint conference.

Figure 3:
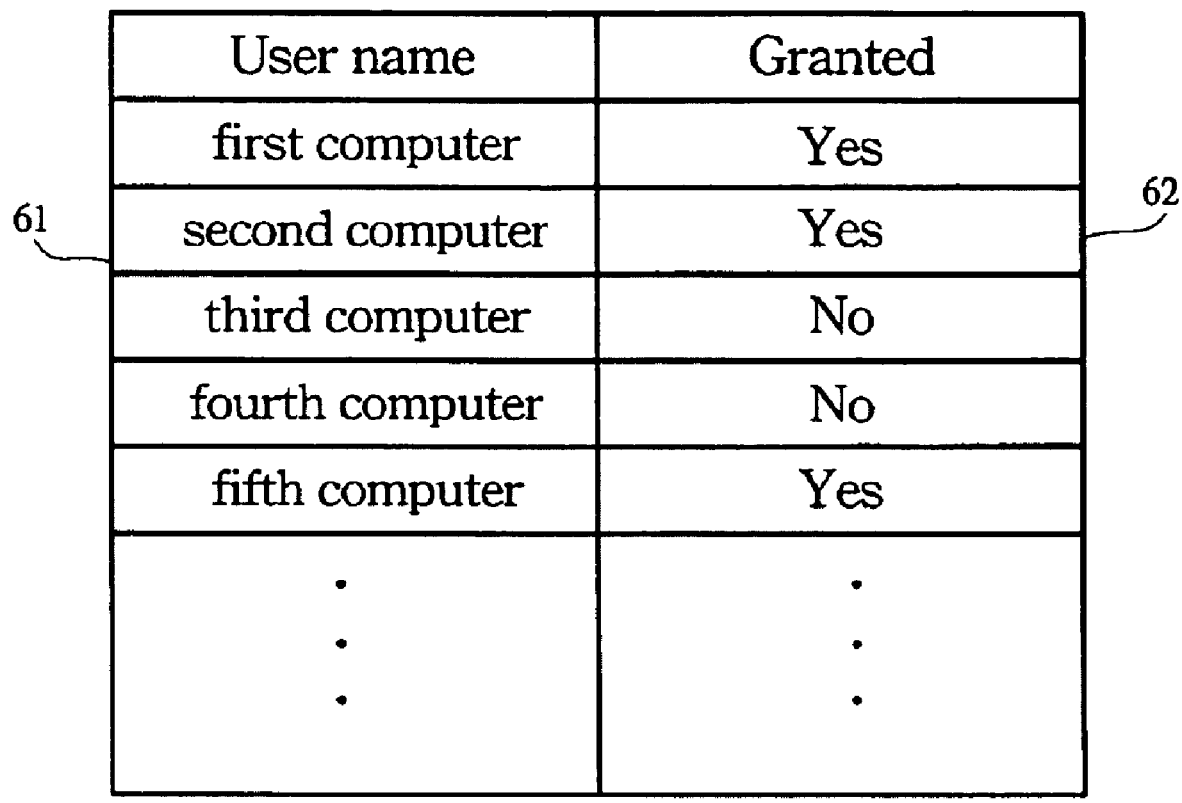
FIG. 3 illustrating a schematic view of a user list and a granted list of the present invention.

The conference control module 3 is the role to play the multipoint communications. For the computer 1 being the first time to join the multipoint conference and, taking a first computer 1a as an example, the conference control module 3 is downloaded to the first computer 1a via the networks of the first computer 1a and the presentation gateway 2. While the conference control module 3 is executed by the first computer 1a, the presentation gateway 2 actively downloads a user list 61 to the first computer 1a, and simultaneously updates all the user lists 61 of the computers 1, as shown in FIG. 3.

Besides, the first computer 1a submits a presentation-request signal to other computers 1 through the conference control module 3a in order to have a granted authority to access the presentation frames 5. After other computers 1 grant the first computer 1a, the conference control module 3a builds up a granted list 62, as shown in FIG. 3. The granted list 62 and the user list 62 can be integrated. The first computer 1a may submit a command to any of the computers 1 of the granted list 62 by means of the conference control module 3a so as to transmit the presentation frames 5 of the commanded computer 1 to the projector 4 or all the computer 1 via the presentation gateway 2.

Likewise, while another computer 1 submits a presentation-request signal to the first computer 1a, the first computer 1a may determine whether the computer 1 is granted to access the presentation frames 5a therein or not via the conference control module 3a. If the first computer 1a grants that a second computer 1b accesses of the presentation frames 5a in the first computer 1a, the granted authority for the second computer 1b accessing the presentation frames 5a can also be canceled by the first computer 1a lately. If the first computer 1a firstly grants the access for the second computer 1b, and continuously grants the access for a third computer 1c, meanwhile the conference control module 3a of the first computer 1a may give the granted authority to the third computer 1c.

To avoid that the multipoint conference being interrupted by any person without relationship to the conference connecting to the presentation gateway 2 via a computer 7, the conference control module 3 of the presentation gateway 2 automatically generates a password 81 for each of the presentation gateway 2 connecting to the projector 4, and the password 81 may be projected to a screen 8 by means of the presentation gateway 2 and the projector 4. Hence, the attendants may know the password 81 on the screen 8 and input the password 81 to the computers 1 thereof so as to join the multipoint conference; otherwise, even though the computer 7 can receive the wireless signal from the presentation gateway 2, the computer 7 cannot join the multipoint conference without the password 81.

Figure 4:
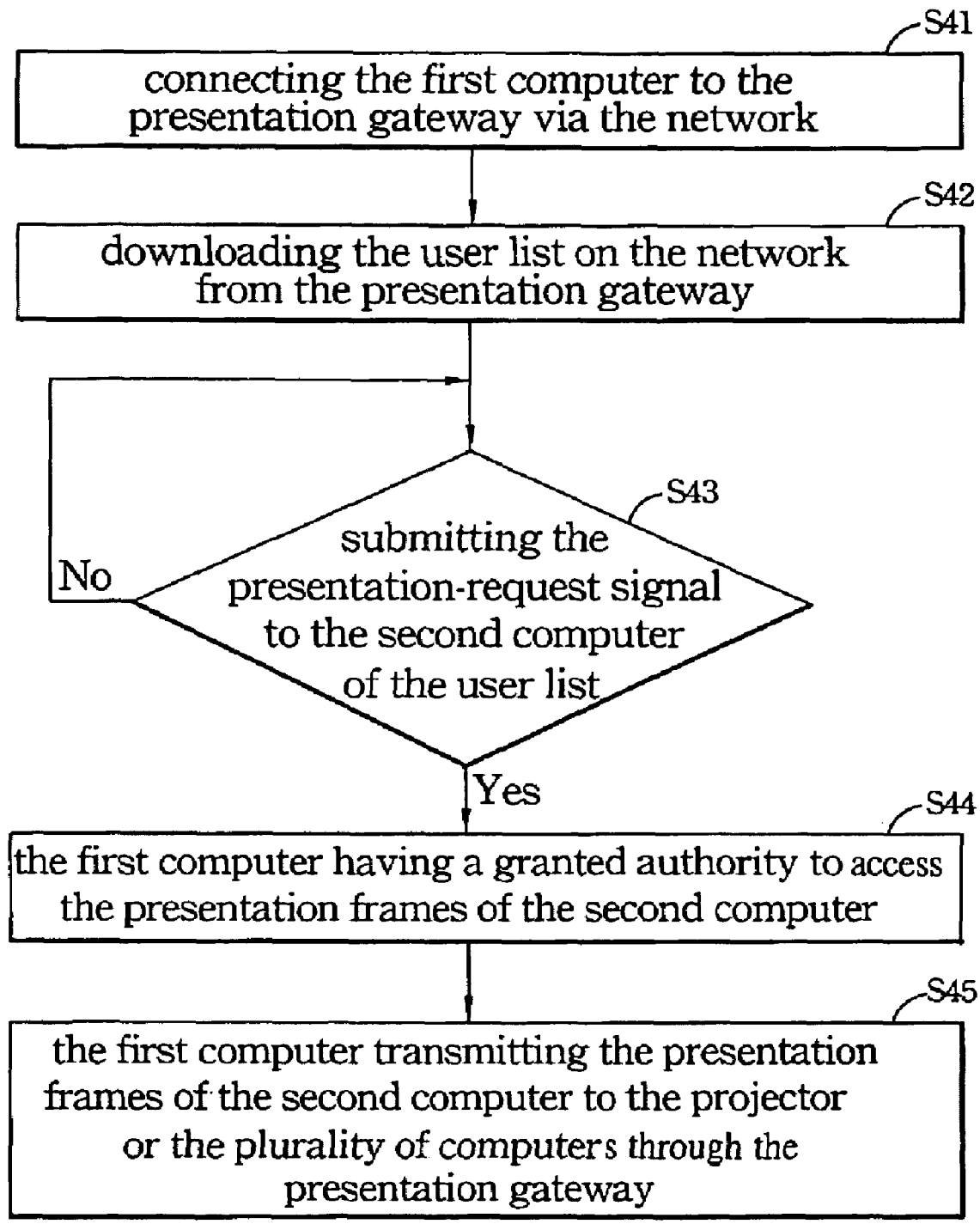
FIG. 4 illustrating a flow chart of a method for controlling the multipoint conference of the present invention.

With reference to FIG. 4, which illustrates a flow chart of a method for controlling the multipoint conference of the present invention. The method includes the steps of: connecting the first computer to the presentation gateway via the network (S41); downloading the user list on the network from the presentation gateway (S42); submitting the presentation-request signal to the second computer of the user list (S43); the first computer having a granted authority to access the presentation frames of the second computer while under the condition of the second computer granting the presentation-request signal (S44); and the first computer transmitting the presentation frames of the second computer to the projector or the plurality of computers through the presentation gateway (S45).

While the first computer has the granted authority to access the presentation frames of the second computer, the first computer may list the second computer into the granted list thereof, therefore the first computer is able to transmit the presentation frames of the second computer at any time, and the user list and the granted list can be integrated via the conference control module. After that, the third computer submits the presentation-request signal to the second computer and is granted, the third computer is the last one has the granted authority to access the second computer. Moreover, the second computer can actively submit a signal to cancel the granted authority of the first computer or the third computer to access.

As the mention above, the present invention provides that any computer owning the granted authority to access the presentation frames of other computers can be a host of the multipoint conference. The user for the host may be through the granted list provided by the conference control module to send a command to the computer or computers on the granted list by way of clicking the mouse thereof, then the presentation frames of the commanded computer or computers are transmitted to other computers or the projector via the presentation gateway.

For the prior art, all the presentation frames must be stored in a computer in advance, continuously opened and closed, until the whole procedures of the multipoint conference are then finished. It is obviously complicate and wasting time. On the contrary, the present invention providing the system and the method for controlling the multipoint conference is capable of opening all the presentation frames of the computers before the multipoint conference and transmitting the selected presentation frames by the host in time so as to make the multipoint conference be more smooth and efficient. Moreover, any computer can be a host to improve the interactive and the communication of the multipoint conference.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for controlling a multipoint conference, the multipoint conference having presentation frames stored in a plurality of computers, the plurality of computers being connected each other as a network through a presentation gateway, the method comprising the steps of:
   connecting a first computer to the presentation gateway via the network;
   downloading a user list on the network from the presentation gateway;
   submitting a presentation-request signal to a second computer of the user list; and
   the first computer having a granted authority to access the presentation frames of the second computer while under the condition of the second computer granting the presentation-request signal.

2. The method for controlling the multipoint conference according to claim 1, wherein the first computer transmits the presentation frames of the second computer to a projector through the presentation gateway.

3. The method for controlling the multipoint conference according to claim 1, wherein the first computer transmits the presentation frames of the second computer to the plurality of computers in the network through the presentation gateway.

4. The method for controlling the multipoint conference according to claim 1, wherein the first computer lists the second computer into a granted list while under the condition of the second computer granting the presentation-request signal.

5. The method for controlling the multipoint conference according to claim 4, wherein the user list and the granted list are integrated by means of a conference control module.

6. The method for controlling the multipoint conference according to claim 5, wherein the conference control module is stored in the presentation gateway, and the conference control module is downloaded to the plurality of computers while the computers are connected to the presentation gateway.

7. The method for controlling the multipoint conference according to claim 1, wherein the second computer submits an authority-prohibit signal to actively cancel the granted authority of the first computer accessing to the presentation frames of the second computer.

8. The method for controlling the multipoint conference according to claim 1, wherein the first computer inputs a password provided by the presentation gateway to connect to the network.

* * * * *